United States Patent
Hurd et al.

(10) Patent No.: US 9,612,992 B2
(45) Date of Patent: Apr. 4, 2017

(54) NETWORKING APPARATUS AND A METHOD FOR NETWORKING

(71) Applicant: ZOMOJO PTY LTD, Sydney, NSW (AU)

(72) Inventors: Matthew Hurd, Belrose (AU); Charles Thomas, Pennant Hills (UA); David Snowdon, Darlinghurst (AU); Scott McDaid, Bilgola Plateau (AU)

(73) Assignee: Zomojo Pty Ltd, Sydney (AU)

(*) Notice: Subject to any disclaimer, the term of this patent is extended or adjusted under 35 U.S.C. 154(b) by 67 days.

(21) Appl. No.: 14/232,689

(22) PCT Filed: Apr. 18, 2013

(86) PCT No.: PCT/AU2013/000404
§ 371 (c)(1),
(2) Date: Jan. 14, 2014

(87) PCT Pub. No.: WO2013/155566
PCT Pub. Date: Oct. 24, 2013

(65) Prior Publication Data
US 2015/0046613 A1    Feb. 12, 2015

Related U.S. Application Data

(60) Provisional application No. 61/625,946, filed on Apr. 18, 2012.

(51) Int. Cl.
*G06F 13/42* (2006.01)
*H04L 12/931* (2013.01)
(Continued)

(52) U.S. Cl.
CPC ............ *G06F 13/4221* (2013.01); *G06F 1/04* (2013.01); *G06F 13/4068* (2013.01);
(Continued)

(58) Field of Classification Search
CPC .... G06F 13/4068; G06F 13/4221; G06F 1/04; H04L 49/00; H04J 3/0697
See application file for complete search history.

(56) References Cited

U.S. PATENT DOCUMENTS 6,018,558 A * 1/2000 Shida .................. H04M 3/10
377/16
6,243,510 B1  6/2001 Rauch
(Continued)

FOREIGN PATENT DOCUMENTS

WO        02/15489 A2     2/2002
WO     2013134810 A1     9/2013

OTHER PUBLICATIONS

Apcon, Inc., "Intellapatch® Physical Layer Switch Overview", 2008, pp. 1-6.
(Continued)

*Primary Examiner* — Nimesh G Patel
(74) *Attorney, Agent, or Firm* — Kelly & Kelley, LLP

(57) ABSTRACT

This specification discloses a protocol agnostic networking apparatus and method of networking. The networking apparatus receives physical layer signal through a plurality of communications ports that interface with external computing systems. A dynamic routing module interconnects the communications ports with discrete reconfigurable data conduits. Each of the data conduits defines a transmission pathway between predetermined communications ports. A management module maintains the data conduits based on routing commands received from an external computing system. The management module interfaces with the dynamic routing module to make and/or break data conduits responsive to received routing commands.

17 Claims, 5 Drawing Sheets

(51) Int. Cl.
*H04J 3/06* (2006.01)
*G06F 1/04* (2006.01)
*G06F 13/40* (2006.01)
*G06Q 40/04* (2012.01)

(52) U.S. Cl.
CPC ............ *H04J 3/0697* (2013.01); *H04L 49/00* (2013.01); *G06Q 40/04* (2013.01)

(56) References Cited

U.S. PATENT DOCUMENTS

| | | | |
|---|---|---|---|
| 6,310,521 | B1 | 10/2001 | Dalmia |
| 6,377,575 | B1 | 4/2002 | Mullaney et al. |
| 6,700,886 | B2* | 3/2004 | Mullaney et al. ............ 370/365 |
| 6,737,958 | B1 | 5/2004 | Satyanarayana |
| 6,856,600 | B1* | 2/2005 | Russell et al. ................ 370/244 |
| 8,743,715 | B1* | 6/2014 | Eddy et al. .................... 370/252 |
| 2002/0133730 | A1* | 9/2002 | Zabinski ............... H04L 7/0338 713/400 |
| 2002/0161912 | A1 | 10/2002 | Vasquez et al. |
| 2003/0058894 | A1 | 3/2003 | Feuerstraeter et al. |
| 2004/0081196 | A1* | 4/2004 | Elliott ........................... 370/465 |
| 2006/0112188 | A1 | 5/2006 | Albanese et al. |
| 2007/0200594 | A1 | 8/2007 | Levi et al. |
| 2008/0192727 | A1 | 8/2008 | Pesusich et al. |
| 2008/0240090 | A1* | 10/2008 | Heller et al. ................. 370/360 |
| 2010/0166426 | A1* | 7/2010 | Watanabe ............ H04B 10/291 398/81 |
| 2012/0124257 | A1* | 5/2012 | Wu ........................ H01L 25/18 710/106 |
| 2012/0224804 | A1* | 9/2012 | Hashimoto .......... G02B 6/4214 385/14 |

OTHER PUBLICATIONS

Analog Devices, Inc., "Xstream™ 33X17, 1.5 Gbps Digital Crosspoint Switch AD8150", 2005.
Texas Instruments Inc. "DS125RT410 Low Power Multi-Rate Quad Channel Retimer", Apr. 2011.
Maxim Integrated Products Inc., "Application Note 1925 HFTA-07.0: Precision Reference Clock Usage in Clock and Data Recovery Circuits", Mar. 13, 2003.
International Search Report and Written Opinion for PCT/AU2003/000404, mailing date of Jul. 23, 2013.
Innovation Patent Examination Report No. 2 for Australian Patent Application No. 2013101670, mailing date of May 30, 2014.
Patent Examination Report No. 1 for Australian Patent Application No. 2013248939, mailing date of May 30, 2014.
Patent Examination Report No. 2 for Australian Patent Application No. 2013248939, mailing date of Oct. 21, 2014.
Supplementary European Search Report for the European Application No. EP13778089 dated Mar. 26, 2015.
K. Grimble et al., "10 Gb/s Packet Switching Using Custom and Commercial GaAs ICs", Gallium Arsenide Integrated Circuit Symposium, 1989, pp. 23-26.
"Product brief VSC3172: 6.5 Gbps 72x72 Asynchronous Crosspoint Switch", https://www.vitesse.com/products/product/VSC3172, Jan. 2006, pp. 1-2.

* cited by examiner

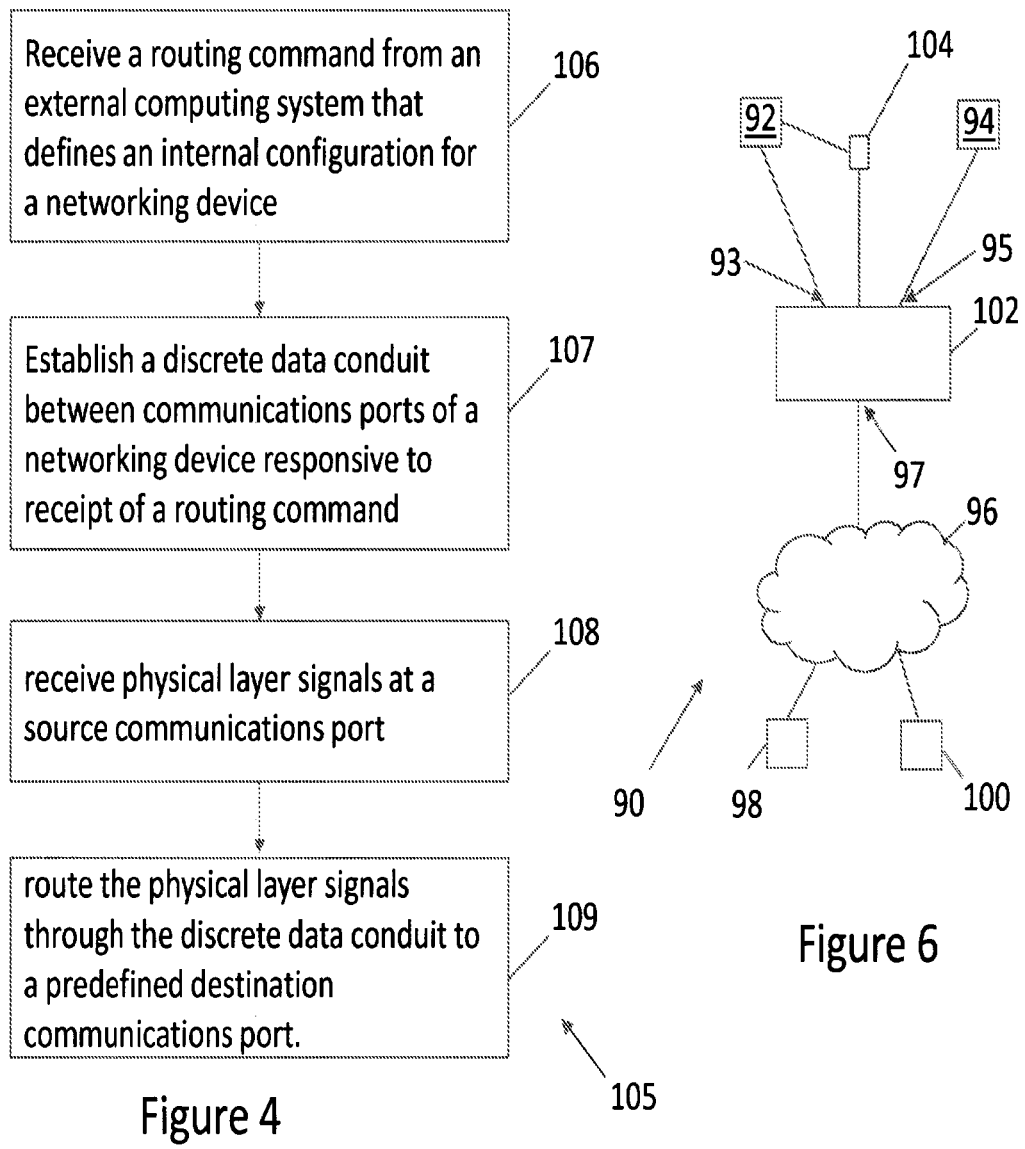

NETWORKING APPARATUS AND A METHOD FOR NETWORKING

FIELD OF THE INVENTION

The disclosure of this specification relates generally to low latency data communications, and more particularly (but not exclusively) to a reconfigurable networking system and a method for low latency networking.

BACKGROUND

Communication latency is a measure of delay between releasing communication transmissions and the transmissions being received. Latency in data communication networks is introduced by physical limitations of the networking equipment (including transmission mediums) and transmission signal processing procedures implemented during sending and receipt. The latency of communications may, in some applications, be an important factor in securing a desired outcome. For example, being the first to have a complete electronic trade order received by a stock exchange can establish trade priority. Advantage can then be taken of favourable prices for financial instruments, such as shares, derivatives and futures. Being the first to receive market information may enable a trader to take advantage of favourable market conditions before others. In another example, the outcome of a networked electronic game for an individual player may be determinant on the latency of gaming commands transmitted across the network. Being able to send a low latency instruction to place a wager or a bid at an auction, for example, may increase the probability of securing good odds, a good price, or a successful purchase.

SUMMARY OF THE INVENTION

In a first aspect, the present invention provides a protocol agnostic networking apparatus for channeling physical layer signals between computing systems. The networking apparatus comprises:
 a plurality of communications ports that interface with external computing systems to channel physical layer signals,
 a dynamic routing module that interconnects communications ports with discrete reconfigurable data conduits, each of the data conduits defining a transmission pathway between predetermined communications ports for physical layer signals, and
 a management module that maintains a plurality of data conduits based on routing commands received from an external computing system, the management module interfacing with the dynamic routing module to make and/or break data conduits responsive to received routing commands.

In embodiments, the networking apparatus comprises a plurality of clock and data recovery modules that facilitate signal conditioning for low latency signal transmissions. Each of the communications ports is associated with a dedicated clock and data recovery module. In some embodiments, the networking apparatus incorporates a plurality of AC couplings that connect the dynamic routing module to each of the clock and data recovery modules. A centralized reference clock is interfaced with the clock and data recovery modules.

In embodiments, the networking apparatus comprises a crosspoint switch that establishes data conduits between communications ports and redirects physical layer signals between interconnected communications ports. The crosspoint switch being integrated with the dynamic routing module.

In embodiments, the networking apparatus comprises a service port that interfaces with a plurality of the communications ports. The service port being centrally disposed relative to the communications ports and positioned adjacent the dynamic routing module.

In a second aspect, the present invention provides a protocol agnostic networking method. The networking method comprises:
 establishing a discrete data conduit in a protocol agnostic networking apparatus responsive to receipt of a routing command from an external computing system, the data conduit interconnecting a source communications port with a destination communications port,
 receiving physical layer signals at the source communications port, and routing the physical layer signals through the discrete data conduit to the destination communications port.

In embodiments, the method comprises receiving a routing command from an external computing system and reconfiguring the data conduit responsive to the received routing command. The routing command can initialize:
 breaking data conduits to prevent transmission of physical layer signals from source communications ports to destination communications ports.
 adding a destination communications port to data conduits to expand the distribution of physical layer signals from source communications ports.
 establishing data conduits between communications ports of the networking apparatus.

In embodiments, the method comprises reconfiguring a crosspoint switch integrated with the networking apparatus to make and/or break data conduits between communications ports.

In embodiments, the method comprises conditioning a received physical layer signal before routing to a destination communications port. The conditioning may comprise:
 performing a clock recovery and signal regeneration process.
 shaping the degraded physical layer signal.

In embodiments, the method comprises replicating a received physical layer signal and channeling the replicated signals to a plurality of communications ports. The replicated physical layer signals are received at a designated service port in some embodiments. The replicated signals are distributed from the service port to a plurality of client communications ports.

In a first aspect, the present invention provides a financial market network. The financial market network comprises:
 a protocol agnostic networking apparatus with a plurality of communications ports and a dynamic routing module that reconfigurably interconnects communications ports with discrete data conduits,
 a management module that configures the dynamic routing module by making and/or breaking data conduits based on discrete routing commands, the routing commands being independent of physical layer signals channeled by the networking apparatus,
 a financial broadcast server that disseminates market information, the financial order server being interfaced with a service port of the networking apparatus communications ports,
 a plurality of client computing systems that receive market information from the financial broadcast server, the client systems being interfaced to client communications ports of the networking apparatus, and a plurality of data conduits that define transmission pathways between the service communications ports and the client communications ports to facilitate transmission of physical layer signals.

In embodiments, the financial market network comprises a client controller that monitors the client computing systems for trading irregularities and initiates reconfiguration of the routing module responsive to determination of a client irregularity.

The networking apparatus and method disclosed in this specification achieves low latency signal communications by removing processing overheads involved with higher layer data transmission protocols (such as TCP/IP and UDP). This enables communications to be channeled through the networking apparatus with minimal delay.

Any features of the above disclosed systems, methods, network, and module may be combined, if possible.

BRIEF DESCRIPTION OF THE FIGURES

Embodiments of the invention will now be described by way of example only with reference to the accompanying figures, in which:

FIG. 4 is a flow diagram of a networking method that the networking apparatus may implement;

FIG. 6 is a schematic representation of a failsafe computing network configuration.

DETAILED DESCRIPTION

A low latency networking apparatus is disclosed in this specification. The device functions at layer 1 of the Open Systems Interconnection (OSI) model to channel physical layer signals between computing systems without processing signal metadata (such as packet headers). This reduces transmission latency by removing processing overheads associated with higher layer signal transmission protocols (such as TCP/IP and UDP).

The networking device implements a 'data agnostic' signal channeling process that is not influenced by higher level transmission protocols. The process operates directly on physical layer signals. This enables the networking device to channel data transmissions that adhere to different transmission protocols without prejudice.

The networking device channels physical layer signals through preconfigured pathways (termed 'data conduits'), instead of determining the destination of a transmission from metadata associated with the signal. This avoids metadata detection and decoding procedures associated with higher layer transmission protocols. Physical layer signals are directed from a source communications port to a destination communications port using preconfigured data conduits. The signal may be channeled to a plurality of destination ports in 'one-to-many' routing configurations.

The disclosed networking device comprises a plurality of communications ports that interface with external computing systems to channel physical layer signals. A dynamic routing module interconnects the communications ports with discrete reconfigurable data conduits. Each of the data conduits defines a transmission pathway between predetermined communications ports for physical layer signals. This enables the physical layer signals to be channeled from one computing system to another computing system with low transmission latency. The signals may be channeled to a plurality of computing systems in 'one-to-many' routing configurations.

The networking device incorporates a management module that maintains the data conduits. The management module receives routing commands from an external computing system and manipulates the data conduits based on the received commands. The routing commands are independent of the physical layer signals being channeled by the networking device. The management module interfaces with the dynamic routing module to make and/or break data conduits responsive to received routing commands.

A crosspoint switch is typically integrated with the routing module to establish data conduits between predetermined communications ports. The crosspoint switch may incorporate semiconductor switches, optical splitters and/or other components to facilitate signal transmission. The management module controls the crosspoint switch to redirect physical layer signals between the communications ports. The crosspoint switch creates suitable connections (such as electrical or optical pathways) between the respective ports.

Figure 1:
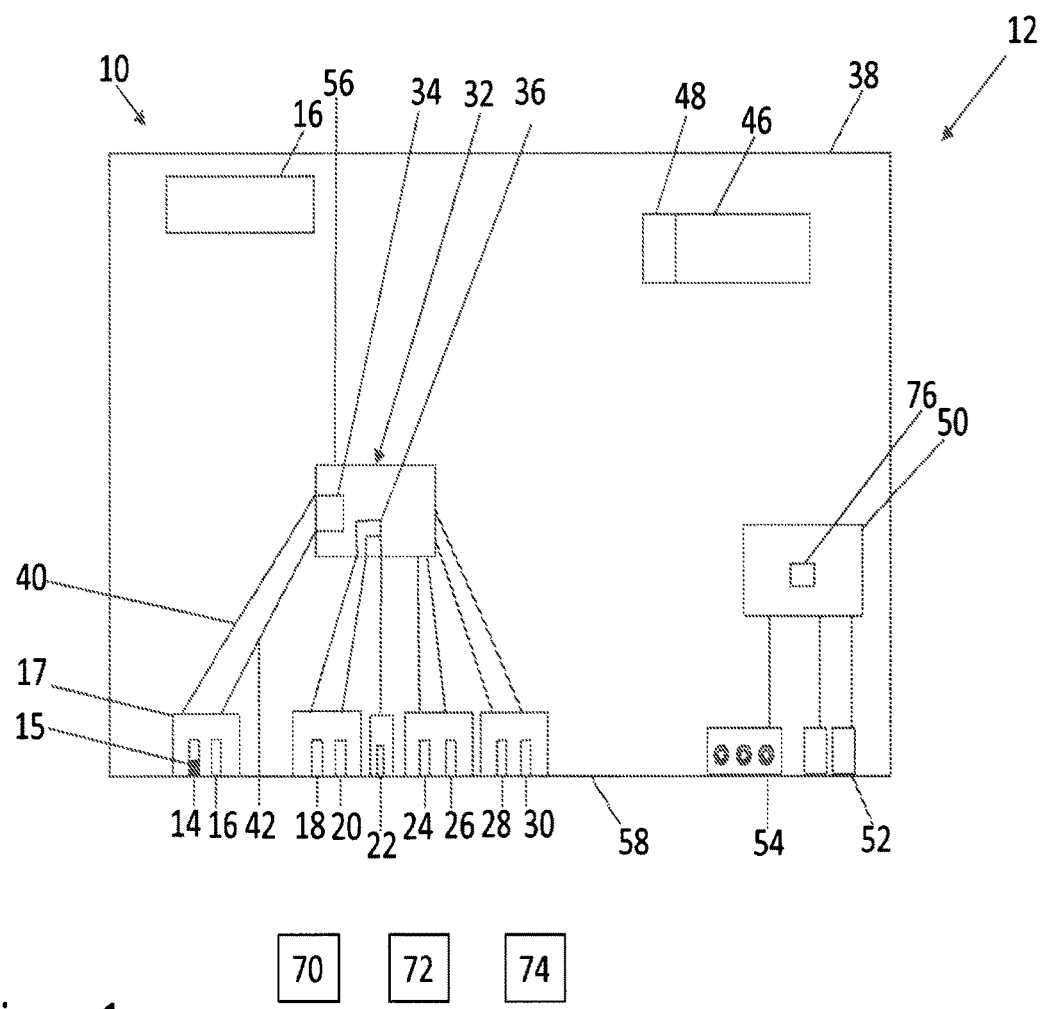
FIG. 1 is a schematic diagram of an embodiment of a networking apparatus illustrating the establishment of a data conduit between communications ports.

FIG. 1 shows a schematic diagram of an embodiment of a networking device for use in a data network 12. The networking device 10 can be implemented in a variety of networks, including wide area networks such as the internet, an Ethernet network or Infiniband™ network. The illustrated networking device 10 has a plurality of communication ports, generally identified by reference numerals 14 to 30. The communications ports 14 to 30 convey data signals between components that are connected to the networking device.

The networking device incorporates a dynamic routing module 32 that channels physical layer signals between the communications ports. The routing module 32 establishes reconfigurable data conduits between the communication ports 14 to 30 to facilitate signal transmissions. Each data conduit interconnects at least two communications ports.

The routing module 32 shown in FIG. 1 is configured to connect ports 14 and 16 in a 'one-to-one' routing configuration with a dedicated data conduit 34. The networking device 10 can facilitate both unidirectional and bidirectional data channeling in 'one-to-one' routing configurations. The routing module 32 may also establish 'one-to-many' port configurations with conduits that interconnect more than two ports. A 'one-to-many' routing configuration is also depicted in FIG. 1, with ports 18, 20 and 22 interconnected by conduit 36. 'One-to-many' routing configurations are typically used where data distribution equality is important as the signal is simultaneously channeled to each destination computing system with negligible discrimination. The networking device 10 is restricted to unidirectional data channeling in 'one-to-many' routing configurations The connections, or data conduits, established by the routing module 32 are readily reconfigurable. The routing module 32 and communications ports 14 to 30 are arranged to operate at layer 1 of the Open Systems Interconnection (OSI) model (true physical-layer networking). Consequently, the networking device 10 is protocol independent ("protocol agnostic"). Existing 'physical layer' devices often incorporate higher level signal interpretation (such as retrieving header information from transmitted signals) despite claiming 'physical layer' or 'layer 1' operation. Higher level signal interpretation can require logical operations that introduce latency.

Embodiments of the layer 1 networking device 10 disclosed in this specification are capable of operating over a wide range of bit rates. For example, the networking device 10 may be compatible with any one of 10BASE5 Ethernet bit rate, 10BASET Ethernet bit rate, Fast Ethernet, Gigabit Ethernet, 10 Gigabit Ethernet and 100 Gigabit Ethernet.

The networking device 10 incorporates a management module 50 that facilitates configuration of the dynamic routing module 32. The management module 50 comprises a control system (such as a microprocessor or dedicated control circuitry) and a communications interface (such as a serial and/or Ethernet interface 52). The control system regulates operation of the networking device 10, including configuration of the dynamic routing module 32. The communications interface connects the management module to an external computing system or network to facilitate service communications (such as diagnostic exchanges and reception of configuration commands). The management module 50 makes and/or breaks data conduits within the routing module 32 responsive to routing commands received from an external computing system. This enables the networking device 10 to be configured without physical interaction. The management unit 50 may also control active indicia 54 (such as LED status lights) mounted to the exterior of the enclosure for low level fault detection (such as faults effecting the management module communication interface 52).

Figure 2:
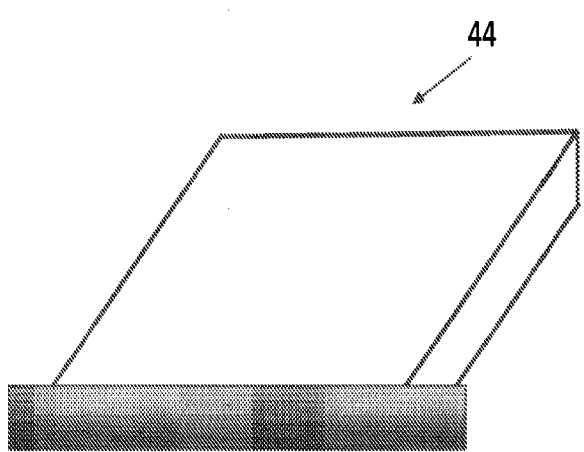
FIG. 2 is a schematic representation of a rack mountable enclosure in which the networking apparatus of FIG. 1 may be housed.

The illustrated embodiment of the networking device 10 has a multilayer printed circuit board 38. Components are mounted to the circuit board 38 and generally interconnected to each other by conductive pathways 40 (for example, tracks, signal traces, strip lines and/or micro strip lines and wires). The illustrated printed circuit board 38 is coupled to various surface mounted and/or through hole components. FIG. 2 shows a rack mountable enclosure 44 in which the printed circuit board 38 can be housed (although other housings are possible). The multilayered circuit board 38 illustrated in FIG. 1 is arranged for horizontal disposition within the rack mountable enclosure, which is in turn configured to be horizontally mounted within a rack. This arrangement reduces the amount of rack space used by the networking device.

The illustrated enclosure occupies a single rack slot. The rack mountable enclosure is ideally mounted in either the top position or the bottom position of a rack. Generally, communications cables approach a rack in a data center from one of the top and bottom ends of the rack. Having the enclosure mounted at the end of the rack approached by the communication cables may result in a relatively lower average and/or maximum latency.

A power supply 46 is mounted to the printed circuit board 38 in the embodiment illustrated in FIG. 1. The power supply 46 produces a DC operating voltage for the networking device components (typically a relatively low voltage, such as 12, 24 or 48 volts) from an AC source (usually a relatively high voltage associated, such as 110V or 240V mains supply from the electricity grid). A DC regulator 48 (such as a switched mode power supply module) is also mounted to the printed circuit board 38 in the illustrated embodiment. The DC regulator 48 receives the voltage output from the power supply 46 and powers a set of active conductive rails that are integrated with the circuit board 38. The power supply and DC regulator may also be mounted to the enclosure separate from the printed circuit board 38. The networking device 10 may also be powered by the rails of the rack where the device is mounted.

A fan 16 is ideally mounted to the circuit board 38 or the enclosure 44 to regulate the temperature of the networking device components. The fan provides airflow across the multilayer printed circuit board to extract waste heat.

Each of the communication ports 14 to 30 incorporates a network interface, such as a transceiver or dedicated transmitter and receiver modules. A transceiver 15 is illustrated with port 14 in FIG. 1. Suitable transceiver modules include GBIC, XFP, XAUI and Small Form Factor Pluggable Plus (SFP+) transceivers.

The transceivers are arranged to interface with physical layer conduits that connect the networking device 10 with external computing devices. Typical physical layer conduits include optical fiber network cables and/or electrical network cables (such as copper cabling). The transceivers interface with the physical layer conduits to send and receive electromagnetic communications (such as optical and/or an electrical signals).

In the illustrated embodiment, each transceivers is configured to engage two fibre optic LC connectors. This enables the networking device 10 to receive electromagnetic communications through one optical fibre and transmit electromagnetic communications through the other (i.e. the networking device 10 uses each optic fibre for unidirectional communications). The transceivers generate electrical signals from received optical signals and communicate the generated electrical signals to electrical conductors integrated with the printed circuit board 38. The transceivers may support data transmissions protocols, such as Ethernet protocol standards SONET, Fibre Channel, or other suitable communications standards.

The illustrated transceivers are grouped and housed in SFP cage enclosures 17 that are fixed to the printed circuit board 38. The enclosures 17, and consequently the communication ports, are disposed adjacent the periphery 58 of the multilayered printed circuit board 38. The cage structure provides an electrical connection between electrical contacts on the transceivers and conductive tracks 40 in (usually stripline and/or micro stripline tracks) formed on or within the circuit board 38. The enclosures 17 may also act as Faraday cages to reduce electromagnetic interference.

The illustrated routing module 32 incorporates a crosspoint switch 56. The crosspoint switch 56 is interfaced with the communications ports to facilitate exchange of physical layer signals with the corresponding transceivers. Physical layer signals received by the communications ports are transmitted directly to the crosspoint switch 56. The crosspoint switch channels the physical layer signals between communications ports using discrete data conduits that are preconfigured using an independent interface (the management module 50 facilitates configuration of the crosspoint 56 switch in the illustrated embodiment).

The crosspoint switch 56 ideally has some or all of the following attributes:
  non-blocking switching capabilities,
  programmable input equalization, and
  output pre-emphasis settings.

The data conduits established by the crosspoint switch are ideally unregistered and asynchronous so that there are no phase, frequency or signal pattern restriction imposed by the routing module 32. An example of a suitable crosspoint switch is the VITESSE™ VSC3172.

The networking device 10 establishes the discrete data conduits responsive to routing commands from an external computing device. The routing commands are independent of the physical layer signals being channel through the networking device. The data conduits interconnect source communications ports with destination communications ports (although the conduits may be bidirectional). The physical layer signals received at the source communications port are routed through the discrete data conduits to the destination communications port without higher layer processing (such as determining the intended receipt of a data transmission from signal metadata). The signals may be simultaneously routed to a plurality of destinations ports in 'one-to-many' routing configurations.

The illustrated networking device 10 includes a service port 22 that is designated for a broadcast server. The remaining communication ports 14 to 20 and 24 to 30 are designated for client computing systems that receive communications from the broadcasts server. This configuration is often used to facilitate nondiscriminatory data dissemination from the server to the client computing systems. The routing module 32 is typically configured in a 'one-to-many' unidirectional routing configuration for server broadcasts, so that communications from the server are simultaneously channeled from the service port 22 to each of the 'client' ports. In financial applications, the broadcast server may disseminate price ranges for financial instruments (such as shares, derivatives and futures) and the quantity of instruments sold in a defined time period.

The illustrated service port 22 is disposed adjacent the reconfigurable routing module 32. It is also centrally disposed with respect to the remaining client communications ports. This configuration can reduce the average latency of communications travelling between the service port and the client ports. For example, embodiments having the service port to one side of all of the client ports may have higher average and maximum latency between the client ports and the service ports. Having the service port as close as possible to the routing module 32 may result in a relative reduction in latency.

The routing module 32 illustrated in FIG. 1 is arranged to condition degraded communications that are received by the networking device. Some degree of signal degradation is generally inevitable during high speed communication transmission. Signal degradation increases the probability of data errors. The routing module 32 shapes the waveform of degraded communications to conform as close as possible with a desired waveform shape (usually comprising a train of square pulses) by adjusting various frequency components of the physical layer signal. The routing module may also perform a pre-emphasis routine to compensate for expected losses during transmission. Pre-emphasis generally involves overdriving high frequency components of the signal.

Figure 3:
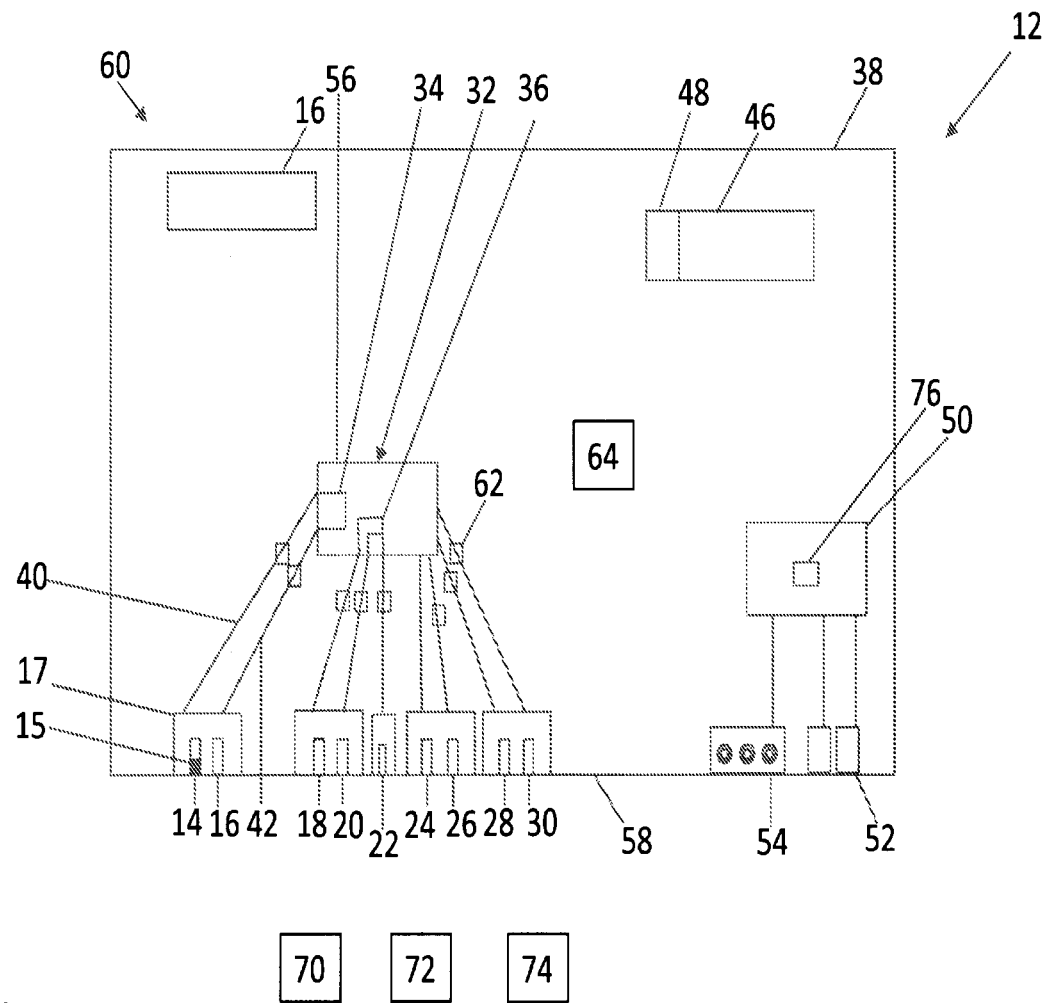
FIG. 3 is a schematic diagram of another embodiment of a networking apparatus.

Another embodiment of networking device 60 is illustrated schematically in FIG. 3. The networking device 60 retains the fundamental structure and operation of the device 10 illustrated in FIG. 1, Similar reference numerals are used in FIG. 3 to identify components with similar or identical form and/or function to corresponding components identified in FIG. 1.

The networking device 60 illustrated in FIG. 3 incorporates a plurality of dedicated clock and data recovery (CDR) modules 62. Each of the clock and data recovery (CDR) modules 62 is interfaced to a communication port. The illustrated clock and data recovery (CDR) modules 62 are AC coupled to the routing module. A reference clock 64 is mounted to the circuit board and interfaced with each of the clock and data recovery modules in the illustrated embodiment. Tracks within the circuit board connect the reference clock 64 with the individual clock and data recovery (CDR) modules 62.

The reference clock 64 generates an approximate frequency reference that is transmitted to each of the dedicated clock and data recovery (CDR) modules. The clock and data recovery (CDR) modules 62 generate a clock from the approximate frequency reference and phase align transitions in the signal stream using an internal phase locked loop. The sampling phase is then determined with reference to an eye diagram structure. The clock and data recovery (CDR) modules regenerate degraded signals to reduce jitter and a produce a more open eye relative to the original signal received by the networking device 60.

A flow diagram representation of a networking method that the networking devices 10, 60 may implement is illustrated in FIG. 4. The flow diagram 105 represents a protocol agnostic process for channeling physical layer signals between communications ports. The method illustrated comprises four operations 106, 107, 108, 109. The operations documented in the flow diagram 105 are:

Receiving a routing command from an external computing system (operation 106). The command is transmitted independently of signals being channeled through the device and may be received by a dedicated communications interface (such as the management module interface 52). The routing command defines an internal configuration for the networking device.

Establishing a discrete data conduit between communications ports of the networking device responsive to receipt of a routing command (operation 107). The routing command may define an internal configuration for the networking device (such as the routing command identified in operation 106) or cause the networking device 10, 60 to revert to a predefined default configuration (such as an initialization state or a failsafe configuration).

Receiving physical layer signals at a source communications port (operation 108). The networking device 10, 60 is capable of processing signals that adhere to different protocols because the physical layer signals are channeled without extracting any information from the signal (such as signal headers).

Routing the physical layer signals through the discrete data conduit to a predefined destination communications port. The data conduit linking the source communications port to the destination communications ports is established in advance of signal reception as the destination port for a signal transmission is configured independently of the physical layer signal being channeled.

Operation 106 of the flow diagram (receipt of routing commands) may be bypassed when the operating configuration of the networking device 10, 60 satisfies scheduled signal transmissions (i.e. no routing changes are required to channel schedule transmissions). Routing commands are typically transmitted to the networking device 10, 60 to initiate reconfiguration of data conduits. They may also be used to initialize the device (although the networking devices 10, 60 may store preconfigured initialization states).

The networking device 10, 60 may implement other operations that supplement the general networking functionality summarized in FIG. 4. These operations include:

breaking data conduits responsive to received routing commands to prevent transmission of physical layer signals from a source communications port to a destination communications port.

adding a destination communications port to an established data conduit responsive to a routing command to expand the distribution of physical layer signals from a source communications port.

establishing data conduits between communications ports of the networking device responsive to a routing command.

reconfiguring a crosspoint switch integrated with the networking device to make and/or break data conduits between communications ports.

distributing a communication received by a service port to a plurality of client ports; and conditioning a received physical layer signal before routing to a destination. communications port by performing a clock recovery and signal regeneration process to condition to received physical layer signal and/or shaping the degraded physical layer signal.

The networking device 10 may be used to remotely configure and/or reconfigure a data network 12 by sending routing commands from an external computing system. The networks 12 illustrated in FIGS. 1 and 3 comprise a broadcast server 72 that is interfaced with the service port 22 of the respective networking devices 10, 60. A plurality of client systems 70, 74 are interfaced with client communications ports 18, 30. The service port 22 and the client ports 18, 30 can be remotely linked (by establishing a data conduit between the respective ports) or isolated (by breaking an existing data conduit) from an external computing system by issuing appropriate routing commands. This allows the dissemination of physical layer signals from the server 72 to the clients 70, 74 to be manipulated from a remote computing system.

Routing commands that reconfigure the networking device routing module 32 are typically received and processed by the management module 50. The illustrated management module 50 receives the routing commands through a dedicated management port 52. These commands may be issued by a remote computing system, allowing the networking device 10, 60 to remain physically isolated.

The ability to remotely configure the networking device 10, 60 is desirable in some applications. For example, a stock exchange may have a secure data center that hosts financial order server(s) and/or client machines participating in an electronic trading network. Physical access to the secure data center is generally restricted during trading hours. Consequently, it can be problematic to reconfigure electronic trading networks that require manual intervention during trading hours. The networking device 10, 60 disclosed in this specification facilitates reconfiguration of the electronic trading network during trading hours by communicating with computing systems on a segregated management network. The management network can often include computing systems located remote of the data center without breaching trading protocols as the management network is isolated from the trading network. The networking device 10, 60 is also advantageous in this exemplary application because it operates at relatively low latency compared to contemporary networking systems. This is particularly desirable in latency sensitive environments.

The networking devices 10, 60 illustrated in FIGS. 1 and 3 incorporates a client controller 76 that monitors client systems for irregularities. The client controller 76 can isolate client systems that exhibit irregularities by breaking the data conduit(s) that interconnect the client system with the network 12. Client irregularities are typically quantified by application specific parameters. The client controller may monitor designated parameters directly or receive updates from a remote system.

The client controller 76 isolates client systems when a monitored client parameter satisfies defined disconnection conditions. Disconnection conditions for financial applications can include pre-order risk conditions, post-order risk conditions and financial ordering system subscription conditions. Breaking data conduits in these situations disconnect the client system from a financial order server. 'On-board' client controllers (such as the client controller illustrated in FIGS. 1 and 3) may be an integrated submodule of the management unit or a separate unit interfaced with the routing module (either directly or indirectly through the management module).

The client controller can also be implemented by an external computing system (i.e. remote of the printed circuit board and the enclosure 44) that is interface with the management network. External client controllers ideally interface with the management module through the dedicated management port 52. The management module may transmit client information, such as recent client trading behavior and the financial condition of the client, to external client controllers to facilitate remote client monitoring.

Figure 5:
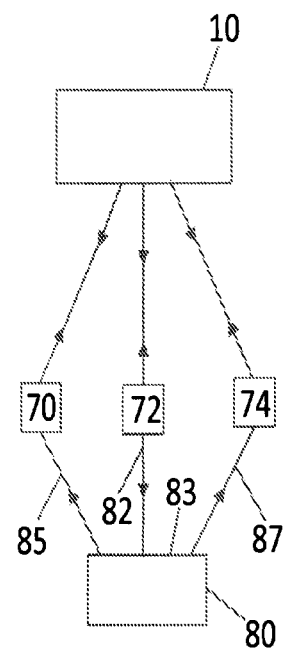
FIG. 5 is a schematic representation of a data replication system.

A data replication system 80 is illustrated in FIG. 5. The replication system can be used in various environments to disseminate information. In financial applications, the replications system can be used in conjunction with a financial ordering system. The illustrated data replication system comprises two networking devices 10, 80 (a primary networking device 10 and a secondary networking device 80). The networking devices 10, 80 are both interfaced with the broadcast port 82 of a financial order server 72. They are also interfaced with a plurality of client systems 70, 74.

The secondary networking device 80 illustrated in FIG. 5 is internally configured to replicate physical layer signals received from the financial order server 72 for dissemination to the client computing systems 70, 74. A 'one-to-many' unidirectional conduit configuration is established within the routing module of the secondary networking device 80 to channel communications from the financial order server 72 ('one') to the client systems 72, 74 ('many'). The primary networking device 10 is configured for 'one-to-one' bidirectional communications between the financial order system 72 and the client computing systems 72, 74.

The replication system 80 illustrated in FIG. 5 is particularly advantageous in latency sensitive applications (such as financial applications where accurate market information is critical).

A failsafe computing network 90 is illustrated in FIG. 6. The computing network 90 comprises a plurality of servers 92, 94 that are interfaced to a common network 96. The network 96 interconnects the servers 92, 94 to a plurality of client machines 98,100. Typical networks include the internet, local area networks wide area networks.

Generally, the servers 92, 94 are deterministic computing systems that are maintained with the same (or very similar) internal states. An active server 92 services the client systems 98, 100 during regular network operation. The secondary server 94 functions as a 'live backup'. If the active server 92 fails, the backup server 94 is brought 'online' to service the client systems 98, 100 in place of the failed server 92.

The illustrated computing network 90 incorporates a low latency networking device 102 that functions in accordance with the disclosure of this specification. Each of the servers 92 and 94 are interfaced with the networking device 102 through dedicated communications ports 93, 95. A routing module (integrated with the networking device 102) establishes data conduits that interconnect the server communication ports 93, 95 to the network communication ports 97. The network port 97 is centrally disposed port in the illustrated embodiment, with the server ports 93 and 95 disposed on opposite side. This port allocation minimizes latency for communication channeled from the network to the servers 92, 94 (such as stock orders placed by the client computing systems 98, 100).

A fault detector 104 monitors the active server 92 for faults. The illustrated fault detector 104 is interfaced with the active server 92 and the networking device 102. The fault monitor 104 is arranged to detect server faults and initialize failover to the backup server (typically by issuing a failover command to the networking device 102). The networking device 102 typically responds to failover commands by establishing a data conduit between the backup server port 97 with the network port 97. The networking device 102 may also break the data conduit between failed servers and the networking port 97 to isolate the failed server.

Figure 7:
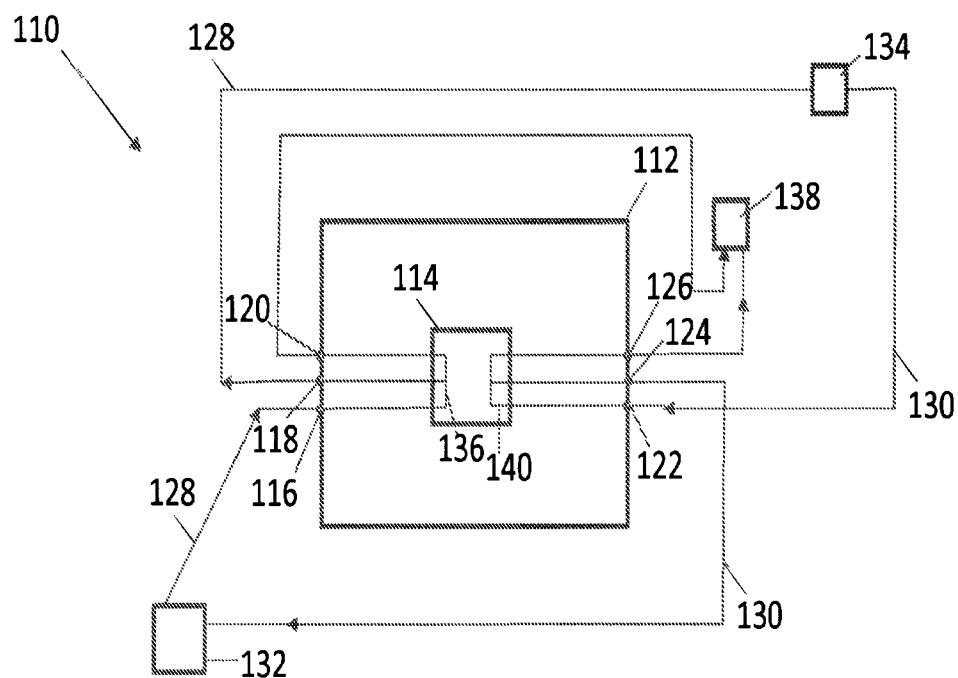
FIG. 7 is a schematic representation of a system for determining latency.

A latency determination system 110 is illustrated in FIG. 7. The system 110 comprises a networking device 112 that operates in accordance with the disclosure of this specification. Communications ports are omitted from the system schematic depicted in FIG. 7 to make the data conduits formed within the routing module 114 easily distinguishable.

The networking device 112 is disposed into a two-way physical link 128, 130 that interconnects two computing systems 132, 134. The routing module 114 illustrated in FIG. 7 is configured to replicate data signals received from the computing systems 132, 134 (the incoming signals are received through communications ports 116, 122) and forward the replicated signal to a time stamp module.

Communications sent from the first computing system 132 are replicated by the networking device 112 using a 'one-to-many' routing configuration (represented by data conduit 136). The networking system 112 channels the replicated signals to a time stamp module 138 and the second computing device 134 respectively. The time stamp module generates a time stamp on receipt of the replicated signal.

Receipt of communications signal from the first computing system 132 triggers a response communication from the second computing system 134. The response communication transmitted by the second computing system 134 is similarly replicated and distributed by the networking device 112.

The response signal transmitted by the second computing system 134 is replicated using a 'one-to-many' routing configuration (represented by data conduit 136). The networking system channels the replicated signals to the time stamp module 138 and the first computing system 132 respectively. The time stamp module generates another time stamp on receipt of the replicated response signal. The two time stamps can then be differenced to determine the network latency.

Variations and/or modifications may be made to the embodiments described within this specification without departing from the spirit or ambit of the invention. For example, while the networks described above may comprise optical and/or electrical Ethernet (for example 10 Mb, 40 Mb, 1 Gb, 10 Gb, 40 Gb, 100 Gb, 400 Gb, 1 Tb), it will be understood that other network types and protocols may be used, such as INFINIBAND and WiFi. Alternatively or additionally, one or more of the connections may alternatively be a serial port connection, a USB port connection, a FireWire™ port connection, a ThunderBolt™ port connection, a PCI or PCIe connection, a SONET (or SDH) connection with or without a sonnet demultiplexing device, or generally any suitable type of connection. The servers may be computer game and/or gambling servers. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A networking apparatus comprising:
   a plurality of communications ports that interface with external computing systems to channel physical layer signals,
   a dynamic routing module comprising a crosspoint switch that interconnects communications ports with discrete reconfigurable and asynchronous data conduits and redirects physical layer signals between interconnected communications ports, each of the data conduits defining a transmission pathway between predetermined communications ports for physical layer signals, the crosspoint switch being integrated within the dynamic module,
   a management module that administers data conduits within the dynamic routing module, the management module interfacing with the dynamic routing module to make and/or break data conduits responsive to received routing commands,
   wherein the network apparatus is arranged to condition degraded physical layer signals received at the network apparatus, using:
   a reference clock, and a plurality of clock and data recovery modules interfaced with the reference clock and the communication ports, the clock and data recovery modules being configured to use a clock derived from the reference clock to regenerate the degraded physical layer signals received via the communications ports; and
   a signal processing engine configured to adjust at least one frequency component of the physical layer signal to shape the waveform of the degraded physical layer signal to conform with a desired waveform shape.

2. The networking apparatus of claim 1 wherein the clock and data recovery modules are configured to use a frequency reference produced by the reference clock to generate the clock, and realign transition within the signals to the generated clock using a phase locked loop.

3. The networking apparatus of claim 2 comprising a plurality of AC couplings that connect the dynamic routing module to each of the clock and data recovery modules.

4. The networking apparatus of claim 1 wherein the dynamic routing module includes a signal processing engine that pre-emphasizes frequency components of physical layer signals by overdriving high frequency signal components.

5. The network apparatus of claim 1 wherein the data conduits interconnect to more than two ports.

6. The network apparatus according to claim 1 further comprising a client controller, the client controller configured to monitor irregularities in client systems, the client controller being configured to isolate client systems that exhibit irregularities by breaking the data conduits that interconnect the client system with the networking apparatus.

7. The network apparatus of claim 1 wherein the dynamic routing module includes a signal processing engine that pre-emphasizes frequency components of physical layer signals by overdriving high frequency signal components to compensate for losses during transmission.

8. A networking method comprising:
reconfiguring a crosspoint switch integrated with a networking apparatus responsive to receipt of a routing command to establish a discrete and asynchronous data conduit in the networking apparatus, the data conduit interconnecting a source communications port with a destination communications port,
receiving physical layer signals at the source communications port, conditioning degraded physical layer signals received at the source communications port using a frequency reference derived from a reference clock to phase align transitions in the physical layer signals received via the source communications port, adjusting at least one frequency component of the physical layer signal to shape the waveform of the degraded physical layer to confirm with a desired waveform shape, and routing the conditioned physical layer signals via the discrete data conduit to the destination communications port.

9. The method of claim 8, comprising receiving a routing command from an external computing system and reconfiguring the data conduit responsive to the received routing command.

10. The method of claim 9 comprising breaking the data conduit responsive to the received routing command to prevent transmission of physical layer signals from the source communications port to the destination communications port.

11. The method of claim 9 comprising adding a destination communications port to the data conduit responsive to the received routing command to expand the distribution of physical layer signals from the source communications port.

12. The method of claim 8, comprising receiving a routing command from an external computing system and establishing a data conduit between communications ports of the networking apparatus responsive to the receive routing command.

13. The method of claim 8 comprising generating a clock from the reference frequency, and realigning transition within the physical layer signals to the generated clock using a phase locked loop.

14. The method of claim 8 comprising pre-emphasizing frequency components of physical layer signals by overdriving high frequency components of the physical layer signal.

15. A financial market network comprising:
a networking apparatus with a plurality of communications ports, a dynamic routing module comprising a crosspoint switch that reconfigurably interconnects communications ports with discrete reconfigurable and asynchronous data conduits, the networking apparatus being arranged to condition degraded physical layer signals received at the networking apparatus, using a reference clock, and a plurality of clock and data recovery modules interfaced with the reference clock and the communication ports, the clock and data recovery modules being configured to use a clock derived from the reference clock to regenerate the degraded physical layer signals received via the communications ports,
a signal processing engine configured to adjust at least one frequency component of the physical layer signal to shape the waveform at the degraded physical layer signal to conform with a desired waveform share,
a management module that configures the dynamic routing module by making and/or breaking data conduits based on discrete routing commands, the routing commands being independent of physical layer signals channeled by the networking apparatus,
a financial broadcast server that disseminates market information, the financial order server being interfaced with a service port of the networking apparatus communications ports,
a plurality of client computing systems that receive market information from the financial broadcast server, the client systems being interfaced to client communications ports of the networking apparatus, and
a plurality of data conduits that define transmission pathways between the service communications ports and the client communications ports to facilitate transmission of physical layer signals.

16. The financial market network of claim 15 comprising a client controller that monitors the client computing systems for trading irregularities and initiates reconfiguration of the routing module responsive to determination of a client irregularity.

17. The financial market network of claim 15 wherein the clock and data recovery modules are configured to use a frequency reference produced by the reference clock to generate the clock, and realign transition within the signals to the generated clock using a phase locked loop.

* * * * *